(12) United States Patent
Andersen

(10) Patent No.: US 6,337,908 B1
(45) Date of Patent: *Jan. 8, 2002

(54) TELEPHONE HANDSET, CORDLESS TELEPHONE OR MOBILE TELEPHONE FOR IMPROVING ACOUSTIC PROBLEMS IN A FREQUENCY RANGE

(75) Inventor: Morten Kjeldsen Andersen, Odder (DK)

(73) Assignee: Kirk Acoustic A/S, Horsens (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,046
(22) PCT Filed: Nov. 28, 1997
(86) PCT No.: PCT/DK97/00545
§ 371 Date: Jun. 22, 1999
§ 102(e) Date: Jun. 22, 1999
(87) PCT Pub. No.: WO98/24214
PCT Pub. Date: Jun. 4, 1998

(30) Foreign Application Priority Data

Nov. 28, 1996 (DK) ............................... 1357/96
Mar. 13, 1997 (DK) ............................... 0271/97

(51) Int. Cl.⁷ ............................................... H04M 1/00
(52) U.S. Cl. ................................................. 379/433.02
(58) Field of Search ................................. 379/433, 428, 379/420, 433.02; 381/371, 372, 373

(56) References Cited

U.S. PATENT DOCUMENTS 1,340,807 A    5/1920   Umholtz
4,071,717 A    1/1978   Fidi et al.
4,160,135 A    7/1979   Gorike
4,239,945 A   12/1980   Atoji et al.
5,402,486 A *  3/1995   Wang et al. ............ 379/433.02
5,729,605 A *  3/1998   Bobisuthi et al. ........... 379/433

FOREIGN PATENT DOCUMENTS

| DE | 24 51 427 B2 | 3/1980 |
| EP | 0 232 096 A2 | 8/1987 |
| EP | 0 364 935 B1 | 11/1993 |
| JP | A-61-123388 | 6/1986 |
| JP | A-61-139189 | 6/1986 |

OTHER PUBLICATIONS

Andersen, Morten Kjeldsen, "Application Note Edition 1: Design of Mobile and Cordless Hand–set Offering a Major Improvement in Sound Quality," Leak Tolerant Solutions, Kirk Acoustics, Sep. 1997, pp. 1–8.

* cited by examiner

Primary Examiner—Jack Chiang
(74) Attorney, Agent, or Firm—Oliff & Berridge PLC

(57) ABSTRACT

A telephone handset, a cordless telephone or a mobile telephone (4) comprising a transducer (2) provided as a circular capsule (2), which along a ring-shaped front side by means of a ring-shaped gasket is connected to an inner wall of an earcap plane or an earpiece (10), which in front of the front side of the transducer diaphragm has a number of apertures (14), and where a number of acoustic connections (16) to an interior cavity (6) and occurring leakages of the handset or the telephone are provided in said earcap plane or earpiece (10) in such a manner, that said connections (16) are positioned outside the ring-shaped gasket (12) and preferably outside the circumference of the transducer (2) but inside a diameter determined by the ear represented by a standardized measuring ear, that is inside a diameter of preferably 25 mm.

12 Claims, 1 Drawing Sheet

TELEPHONE HANDSET, CORDLESS TELEPHONE OR MOBILE TELEPHONE FOR IMPROVING ACOUSTIC PROBLEMS IN A FREQUENCY RANGE

BACKGROUND OF THE INVENTION

The present invention relates to a telephone handset for a standard corded telephone (in the following designated telephone handset), a cordless telephone or a mobile telephone of the type described in the introductory part of claim 1.

Telephone handsets, cordless telephones and especially mobile telephones have gradually become so small and compact that sound problems very often occur, in particular in the low frequency range, that is below about 1 kHz. This is caused by the fact that it for the user of small, compact telephones, where the earcap plane or earpiece often do not have the most ideal shape, it may be difficult to avoid reduced sound quality, because the bass range is liable to disappear, if the earpiece is not held close against the ear, that is if too big leakages occur between the ear and the telephone or the telephone handset, respectively.

In general telephone handsets or similar acoustic apparatuses, which are acoustically connected to the surroundings in order to obtain independency of the variable acoustic leakage, must necessarily have a considerable lower acoustic impedance in the acoustic connection between the ear and the surroundings than that of the variations of the acoustic leakages in order to ballance these. On the other hand this also causes a considerable lower acoustic impedance against external noise sources.

The invention has for its purpose to provide a telephone handset, a cordless telephone or a mobile telephone, by which it by means of simple provisions becomes possible to compensate for the said sound problems in the low frequency range caused by the normal occuring leakages between the ear and the telephone or the telephone handset, respectively The telephone handset, the cordless telephone or the mobile telephone according to the invention is distinctive in that a number of acoustic connections to an interior cavity and further on to normal occuring leakages of the handset or the telephone are provided in said earcap plane or earpiece in such a manner, that said connections are positioned—outside the ring-shaped gasket and preferably outside the circumference of the transducer but inside a diameter determined by the ear represented by a standardized measuring ear, that is inside a diameter of preferably 25 mm. By simple provisions possibillity to compensate for leakages between the ear and the telephone or the telephone handset, respectively, is hereby obtained, so that it becomes possible as well during measuring and in use to obtain a low acoustic output-impedance by an interaction between a transducer with adjusted frequency characteristic and an earcap plane or an earpiece with said acoustic connections to the interior cavity of the telephone handset, the cordless telephone or preferably the mobile telephone.

It should be pointed out that the current configuration of said connections, holes or apertures in the earcap plane or the earpiece to the interior cavity of the handset, the cordless telephone or the mobile telephone may be chosen quite arbitrary. It should furthermore be mentioned that in connection with future type approvals of mobile telephones as a demand may be measured with a new type 3.2 measuring ear instead of the present type IEC 318 measuring ear. However, for both measuring ears apply that use are made of coupling pieces with a diameter of 25 mm to form the connection to the earpiece.

In that period where both types of measuring ears in the principle may be required used by the type approval of a certain telephone handset, a certain cordless telephone or a certain mobile telephone it may be actual to use two different variants of transducers and two different designs of earpieces—but of course in principle with the same construction.

Appropriately the handset, the cordless telephone or the mobile telephone according to the invention is such provided, that said acoustic connections in the earcap plane or the earpiece consist of circular apertures.

Or the telephone handset, the cordless telephone or the mobile telephone according to invention may advantageously be such modified that said acoustic connections in the earcap plane or the earpiece consist of narrow rectilinear and/or arched slits, which may form logo of a certain manufacturer.

Preferably the telephone handset, the cordless telephone or the mobile telephone according to the invention is furthermore such modified that said acoustic connections are made resistive (ohmic) preferably by application a netting (mesh) onto said inner wall of the earcap plane or the earpiece. In a particular simple manner a quite resistive acoustic connection between the earpiece and the interior cavity of the telephone handset, the cordless telephone or the mobile telephone—with that purpose to obtain a more optimized frequency caracteristic—is hereby obtained.

With particular advantage the telephone handset, the cordless telephone or the mobile telephone according to the invention in addition may be such modified that said acoustic connections and/or sound apertures of the earcap plane or the earpiece are provided in shape or pattern together with recesses in such a manner, that connections, apertures and recesses preferably in general form company logos of manufacturers of telephone handsets, cordless telephones or mobile telephones.

Alternatively the telephone handset, the cordless telephone or the mobile telephone according to the invention may be of the type where the earcap plane or the earpiece is placed on the internal side of a turnable flap, which from a closed inactive position, where the flap for instance covers the keyboard and the display, and which flap being adapted to be turned out to an active position, where the earcap plane or the earpiece may be pressed against the ear, said telephone handset, cordless telephone or mobile telephone being distinctive in that the transducer is built-in in the flap in such a manner, that the back of the transducer has one or more acoustic connections out through the back of the flap.

By this alternative embodiment it may in particular be appropriate, if the transducer is built-in in the flap in such a manner, that a passage through the flap to the open air is provided in the earcap plane or the earpiece outside the transducer but within said diameter represented by said standardized measuring ear.

BRIEF DESCRIPTION OF THE DRAWINGS

The invention is described in the following in more details in connection with the drawing, in which:

FIG. 3 shows a corresponding partial view of the mobile telephone shown in FIG. 2—seen from the rearside thereof, while

DESCRIPTION OF THE PREFERRED EMBODIMENTS

Figure 1:
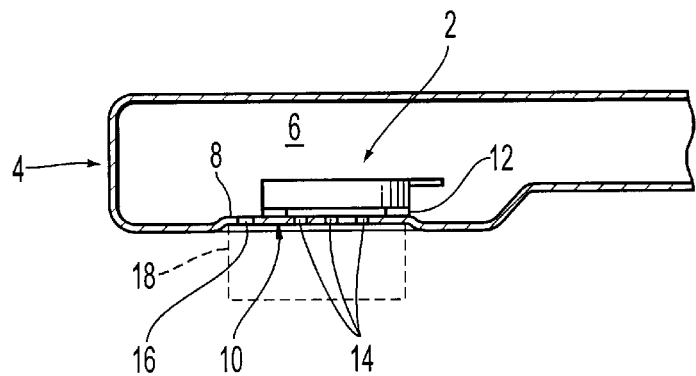
FIG. 1 shows a side view—partly in section—of an embodiment for a cordless telephone or a mobile telephone according to the invention with an earpiece and a transducer.

In FIG. 1 is shown how a transducer 2 is built-in in a mobile telephone 4 in a such manner that the rearside of the transducer 2 turns against and utilizes the interior cavity or volume and occuring leakages of the mobile telephone 4. The transducer 2 is along a ring-shaped front side part secured to an inner wall 8 of an earpiece 10 by means of a ring-shaped gasket or a ring 12 of a double-sided adhesive tape.

In front of the central part of the front side of the transducer 2 the earpiece 10 is provided with a number of sound holes 14 and a connection hole 16 positioned inside a diameter corresponding to the diameter of coupling piece 18 to a measuring ear shown with dotted lines.

Figure 2:
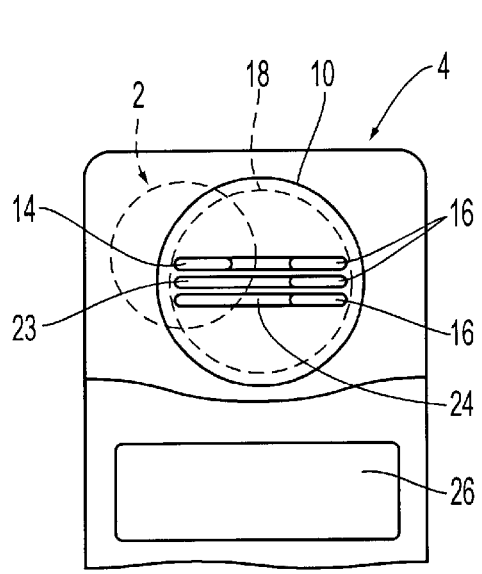
FIG. 2 shows a plane partial view of an embodiment of a mobile telephone according to the invention—seen from the outside thereof.
Figure 3:
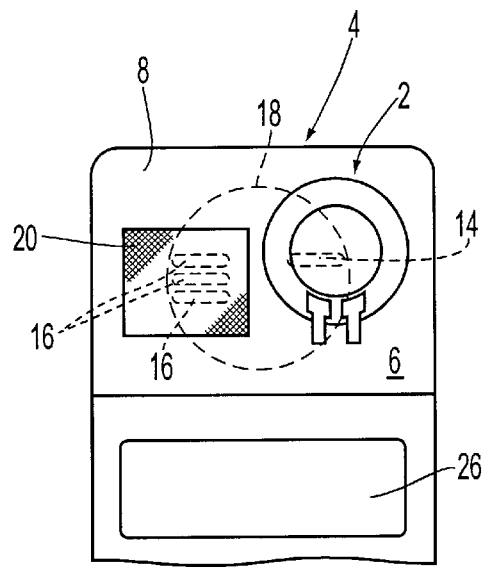

FIGS. 2 and 3 show an uppermost part of a front part of a mobile telephone 4 with an earpiece 10, in the outside of which three straight recesses or depressions 22, 23, 24 are provided. In one end of the uppermost depression 22 an oblong sound aperture 14 is provided while in the opposite ends of all three depressions 22, 23, 24 oblong connection apertures 16 are provided to the interior volume 6 of the mobile telephone 4 also comprising a display 26.

As shown in FIG. 2 the sound aperture 14 and the connection apertures 16 are positioned inside the measuring ear diameter 18—and it is clearly seen that the connection apertures 16 to the interior volume 6 of the mobile telephone 4 is positioned outside the transducer 2 but inside the measuring ear diameter 18. The inner side of the connection apertures 16 are—as shown in FIG. 3—covered by a FINE-meshed netting 20 so that the connections to the interior volume 6 of the mobile telephone 2 acoustic become quite resistive connections.

Figure 4:
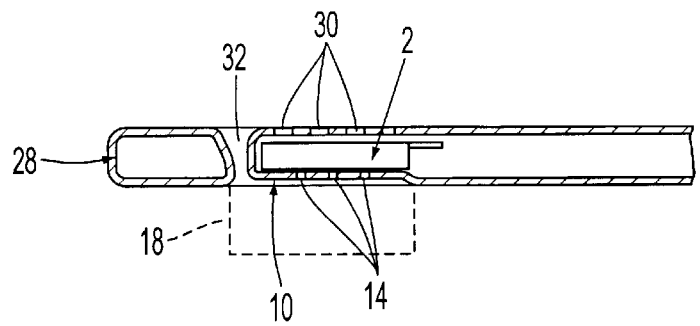
FIG. 4 shows a partial view—partly in section—of a modified embodiment for a mobile telephone with a flap according to the invention.

FIG. 4 shows a modified embodiment for a mobile telephone according to the invention, namely a mobile telephone of the very compact type comprising a flap 28 adapted to be turned out from an inactive position, where the flap 28 for instance covers keyboard and display, to an active use position, where the flap 28 for instance takes up an obtuse angle in relation to the basic part of the mobile telephone, as lautspeaker of the telephone (transducer 2) is mounted in the flap 28 in such a manner, that the earcap plane or earpiece 10 is placed on the internal side of the flap 28, that is that the microfone of the telephone is placed on the basic part for instance below the keyboard. On level with the earcap plane or earpiece the flap 28 has a thickness which just gives space for the transducer 2. The external side of the flap 28 is in front of the rearside of the transducer 2 provided with a number of openings 30 to the open air. Just outside the circumference of the transducer 2 but within the diameter of the measuring ear the flap 28 is provided with a passage 32, so that the front side of the transducer 2 thereby is also connected to the open air, when the earpiece 10 is pressed against an ear.

In other words it is the main aspect of the invention to ensure an improved sound quality in the low frequency range, that is below about 1 kHz, even if use are made of standard-sized transducers as well as small compact transducer capsules which is obtained by connecting the earpiece and in the principle the ear represented by the measuring ear to the interior volume of the telephone handset, the cordless telephone and the mobile telephone.

What is claimed is:

1. A hand-held communications unit comprising
   a housing having a wall defining an inner side and an outer side of the housing, the housing defining a space within the housing,
   a transducer having a periphery and a front side and a rear side, the front side having a center, the transducer arranged with its front side against the inner side of the wall and its rear side facing the space within the housing,
   within the periphery of the transducer, a first totality of openings in the wall, the first totality of openings establishing an acoustic connection between the front side of the transducer and the outer side of the housing, the first totality of openings having a center of gravity which is offset in the plane of the wall relative to the center of the front side of the transducer, and
   outside the periphery of the transducer a second totality of openings in the wall, the second totality of openings establishing, an acoustic connection between the outer side of the housing and the space within the housing, the second totality of openings having a center of gravity which is offset in the plane of the wall relative to the center of the front side of the transducer.

2. A communications unit according to claim 1, wherein the space behind the wall is a space in the communications unit.

3. A communications unit according to claim 1, wherein the front side of the transducer is arranged against the inner side of the wall with an air-tight seal between the first totality of openings and the second totality of openings.

4. A communications unit according to claim 3, wherein a space is present between the front of the transducer and the inner side of the wall.

5. A communications unit according to claim 1, wherein the second totality of openings has an acoustic impedance which is substantially resistive.

6. A communications unit according to claim 5, wherein the second totality of openings is covered by a fine-meshed net.

7. A communications unit according to claim 2, wherein the front side of the transducer is arranged against the inner side of the wall with an air-tight seal between the first totality of openings and the second totality of openings.

8. A communications unit according to claim 7, wherein the front side of the transducer is arranged against the inner side of the wall with an air-tight seal between the first totality of openings and the second totality of openings.

9. A communications unit according to claim 2, wherein the second totality of openings has an acoustic impedance which is substantially resistive.

10. A communications unit according to claim 7, wherein the second totality of openings has an acoustic impedance which is substantially resistive.

11. A communications unit according to claim 3, wherein the second totality of openings has an acoustic impedance which is substantially resistive.

12. A communications unit according to claim 4, wherein the second totality of openings has an acoustic impedance which is substantially resistive.

* * * * *